United States Patent
Herminghaus et al.

(10) Patent No.: US 11,270,232 B2
(45) Date of Patent: Mar. 8, 2022

(54) METHOD FOR TRANSPORTING A PLURALITY OF OBJECTS BETWEEN OBJECT-SPECIFIC LOCATIONS

(71) Applicant: Max-Planck-Gesellschaft zur Foerderung der Wissenschaften e.V., Munich (DE)

(72) Inventors: Stephan Herminghaus, Goettingen (DE); Marc Timme, Dresden (DE); Andreas Sorge, Cologne (DE); Matthias Wendland, Heidesee OT Prieros (DE); Johannes Kassel, Berlin (DE)

(73) Assignee: Max-Planc-Gesellschaft Zur Foerderung Der Wissenschaften E.V., Munich (DE)

( * ) Notice: Subject to any disclaimer, the term of this patent is extended or adjusted under 35 U.S.C. 154(b) by 672 days.

(21) Appl. No.: 16/055,583

(22) Filed: Aug. 6, 2018

(65) Prior Publication Data

US 2018/0349809 A1    Dec. 6, 2018

Related U.S. Application Data (63) Continuation of application No. PCT/EP2017/052529, filed on Feb. 6, 2017.

(30) Foreign Application Priority Data

Feb. 5, 2016    (EP) .................... 16154441

(51) Int. Cl.
*G06Q 10/04*    (2012.01)
*G06Q 50/30*    (2012.01)
(Continued)

(52) U.S. Cl.
CPC ......... *G06Q 10/047* (2013.01); *G06Q 10/083* (2013.01); *G06Q 10/08355* (2013.01);
(Continued)

(58) Field of Classification Search
CPC .............. G06Q 10/047; G06Q 10/083; G06Q 10/08355; G06Q 50/30; G08G 1/127; G08G 1/202
(Continued)

(56) References Cited

U.S. PATENT DOCUMENTS 10,832,206 B2 * 11/2020 Lafrance .......... G06Q 10/08355
2008/0195428 A1 * 8/2008 O'Sullivan ............ G08G 1/123
705/6

(Continued)

FOREIGN PATENT DOCUMENTS

CN    105247545 A    1/2016
EP    1 076 326 A2    8/2000
(Continued)

OTHER PUBLICATIONS

Space—Time Diagrams https://web.archive.org/web/20150424114521/http://www.astro.ucla.edu/~wright/st_diags.htm (Year: 2015).*
(Continued)

*Primary Examiner* — George Chen
*Assistant Examiner* — Lisa Ma
(74) *Attorney, Agent, or Firm* — Daniel J. Santos; Smith Tempel Blaha LLC (57) ABSTRACT

In a method of transporting objects with transport vehicles, a starting point, a destination, a starting time and an arrival time are noted as object coordinates in a space-time. A transport path network of possible transport paths together with average speeds on the possible transport ways is defined. Suitable transport paths of the possible transport paths between the object coordinates of the objects are
(Continued)

determined and noted in the space-time. In the space-time, one of the suitable transport paths per object is bundled into driving routes of the transport vehicles, transport capacities and the actual locations of the transport vehicles of the plurality of transport vehicles being considered. The driving routes together with the object coordinates of the associated objects are transmitted to those transport vehicles involved. Then, the objects are transported in that the transport vehicles involved are driven along the transmitted driving routes.

20 Claims, 5 Drawing Sheets (51) Int. Cl.
G08G 1/127 (2006.01)
G06Q 10/08 (2012.01)
G08G 1/00 (2006.01)

(52) U.S. Cl.
CPC .............. *G06Q 50/30* (2013.01); *G08G 1/127* (2013.01); *G08G 1/202* (2013.01)

(58) Field of Classification Search
USPC ......................................................... 705/338
See application file for complete search history.

(56) References Cited

U.S. PATENT DOCUMENTS

| | | | |
|---|---|---|---|
| 2015/0046083 A1* | 2/2015 | Maitra | H04L 67/12 701/465 |
| 2015/0161554 A1* | 6/2015 | Sweeney | G06Q 10/08355 705/7.15 |
| 2016/0019496 A1* | 1/2016 | Gorlin | H04L 67/104 705/333 |
| 2016/0069694 A1* | 3/2016 | Tao | H04W 4/024 701/410 |
| 2016/0104081 A1* | 4/2016 | Ho | G06Q 10/0633 705/7.27 |
| 2016/0342946 A1 | 11/2016 | Herraiz Herraiz | |
| 2017/0185928 A1* | 6/2017 | Zhou | G06Q 10/083 |

FOREIGN PATENT DOCUMENTS

| | | | | |
|---|---|---|---|---|
| EP | 1 156 462 A2 | 5/2001 | | |
| JP | 2003-006784 A | 1/2003 | | |
| JP | 2004-362271 A | 12/2004 | | |
| WO | WO-2006010593 A1 * | 2/2006 | ........... | G06Q 10/047 |
| WO | 2014/002267 A1 | 3/2014 | | |

OTHER PUBLICATIONS

"Vehicle Routing with Shipment Consolidation". Cortes, Juan. Yoshinori, Suzuki. https://www.sciencedirect.com/science/article/pii/S0925527320300104 (Year: 2020).*
PCT Search Report in co-pending related PCT Application No. PCT/EP2017/052529, dated Apr. 28, 2017.
https://www.bridj.com/how-it-works/; first viewed Nov. 2015.

* cited by examiner

Fig. 5

METHOD FOR TRANSPORTING A PLURALITY OF OBJECTS BETWEEN OBJECT-SPECIFIC LOCATIONS

CROSS REFERENCE

The present application is a continuation to international patent application PCT/EP2017/052529 filed on Feb. 6, 2017 and claiming priority to European patent application EP 16 154 441.6 filed on Feb. 5, 2016, both entitled "Verfahren zum Transportieren einer Vielzahl von Objekten zwischen objektspezifischen Orten".

FIELD

The invention relates to a method of transporting a plurality of objects with a plurality of transport vehicles, a starting point and a destination as well as at least one of a starting time and an arrival time being noted for each object of the plurality of objects.

Further, the invention relates to a data server for carrying out such a method and to the use of the data server.

BACKGROUND

On average, each inhabitant of Germany makes two trips a day with means of transport. In total, these are 160 million trips a day for which mostly private passenger cars are used which are only occupied by very few persons each. Only those people who are willing to walk to the next stop, to spend some time in a normally scheduled public transportation means, and to also walk after disembarking from the nearest stop to their actual destination, use the local public transport. Those people who have no private passenger car or who do not want to use their private passenger cars and who want to be continuously driven from their starting point to their destination will call a taxi. This, however, incurs considerably higher transport cost than incurred by using local public transport.

Already for some time the idea is known to provide a taxi-like service by means of flexible small buses which are not bound to fixed routes but which collect each person promptly at its starting point and carry it to its destination, and whose fares, due to dividing the total cost between several persons transported at one time, are clearly below those of a taxi and in the range of the additional operating cost of a private passenger car for the respective trip. These concepts are also designated as call-a-bus or bus-on-demand. Up to now, however, it has not yet been managed to standardize the driving routes of buses-on-demand or to even determine them automatically so that the buses-on-demand are well utilized to keep the fare per person transported low, on the one hand, and to keep the transport times for all persons transported similarly short as when using private passenger cars, on the other hand. Thus, at present, the demand of buses-on-demand is only low and they cannot break even.

S. Herminghaus, Mean-field theory of demand-driven public transportation, Complex Fluids Internal notes, Issue 45 (February 2015) discusses the conditions under which a bus-on-demand concept may break even. Further, general concepts for an optimization of the driving routes of the transport vehicles involved are described. The implementation of the optimization of the driving routes according to the concepts described nevertheless proves to be extremely complex.

On the website www.bridl.com, a bus transport system is described in which the offer of bus lines between starting points and destinations is adapted to the demand of the passengers. This demand is determined using GPS data from mobile phones, posts in social media and so on.

EP 1 076 326 A2 describes a method and a communication system for steering a plurality of mobile stations to destinations. For this purpose, the actual position of each mobile station is determined by means of a position determination unit, and position data are generated. The position data from the mobile stations are forwarded to at least one coordination station. The forwarded position data of the mobile stations are evaluated, and command data for optimization of the movements of the mobile stations to their respective destinations are generated in the coordination station. The command data are transmitted from the coordination station to the mobile stations.

In a transport service system known from EP 1 156 462 A2, at least one taxi detects its present location by means of a GPS and transmits the present location plus information related to a destination indicated by a customer to a central unit. The central unit determines an optimum route and a prize for the route according to the information related to the present location and the destination. Then, the central unit transmits the determined optimum route and prize to the taxi.

There still is a need of a method of transporting a plurality of objects by means of a plurality of transport vehicles between object-specific locations which optimizes the driving routes of the transport vehicles at a manageable effort in such a way that the transport vehicles are well utilized, on the one hand, and at least one of predetermined starting times and arrival times of the objects transported are kept well, on the other hand.

SUMMARY OF THE INVENTION

The present invention relates to a method of transporting a plurality of objects with a plurality of transport vehicles. The method comprises, for each object of the plurality of objects, noting a starting point and a destination as well as at least one of a starting time and an arrival time as object coordinates in a space-time, and, for each transport vehicle of the plurality of transport vehicles, noting a transport capacity and an actual location. The method also comprises, defining a transport path network of possible transport paths of the transport vehicles of the plurality of transport vehicles together with average speeds of the transport vehicle of the plurality of transport vehicles on the possible transport ways, and, for each object of the plurality of objects, determining suitable transport paths of the possible transport paths between the object coordinates of the respective object based on the transport path network, and noting the suitable transport paths in the space-time. Further, the method comprises, in the space-time, bundling one of the suitable transport paths per object of the plurality of objects into driving routes of individual transport vehicles of the plurality of transport vehicles, wherein the transport capacities and the actual locations of the transport vehicles of the plurality of transport vehicles are considered, and transmitting the driving routes together with the starting points, the starting times, the destinations and the arrival times of the associated objects of the plurality of objects to those transport vehicles of the plurality of transport vehicles which are involved in the respective driving route. Finally, the method comprises transporting the plurality of objects with the plurality of transport vehicles in that the involved transport vehicles of the plurality of transport vehicles are driven along the transmitted driving routes.

The steps of noting particularly include storing the respective data.

Further, the present invention relates to a data server comprising an interface configured for receiving a starting point and a destination as well as at least one of a starting time and an arrival time of each object of a plurality of objects and for receiving actual location of each transport vehicle of a plurality of transport vehicles, a databank configured for storing a transport capacity of each transport vehicle of the plurality of transport vehicles and a transport path network of possible paths of each transport vehicle of the plurality of transport vehicles together with average speeds of the transport vehicles of the plurality of transport vehicles on the transport paths, and a controller configured for controlling the data server. The at least one interface or a further interface is configured for transmitting driving routes to those transport vehicles of the plurality of transport vehicles which are involved in the respective driving route, and the data server is programmed for executing the method according to the invention.

Further, the present invention relates to a method of using the data server according to the invention in the method according to the invention. In this method of use, the starting point and the destination as well as at least one of the starting time and the arrival times of each object of the plurality of objects are received at the interface of the data server. Further, the actual location of each transport vehicle of a plurality of transport vehicles is received at the interface of the data server. The transport capacity of each transport vehicle of the plurality of transport vehicles and the transport path network of the possible transport paths of each transport vehicle of the plurality of transport vehicles together with average speeds of the transport vehicles of the plurality of transport vehicles on the transport paths are stored in the databank of the data server. For each object of the plurality of objects, the starting point and the destination as well as the at least one of the starting time and the arrival time are noted by the controller of the data server as the object coordinates in the space-time. For each object of the plurality of objects, the suitable transport paths of the possible transport paths between the object coordinates of the respective object are determined by the controller of the data server based on the transport path network, and the suitable transport paths are noted by the controller of the data server in the space-time. In the space-time, the one of the suitable transport paths per object of the plurality of objects is bundled by the controller of the data server into driving routes of the individual transport vehicles of the plurality of transport vehicles, wherein the transport capacities and the actual locations of the transport vehicles of the plurality of transport vehicles are considered by the controller of the data server. The driving routes together with the starting points, the starting times, the destinations and the arrival times of the associated objects of the plurality of objects are transmitted by the controller of the data server via the interface or the further interface of the data server to those transport vehicles of the plurality of transport vehicles which are involved in the respective driving route.

Other features and advantages of the present invention will become apparent to one with skill in the art upon examination of the following drawings and the detailed description. It is intended that all such additional features and advantages be included herein within the scope of the present invention, as defined by the claims.

SHORT DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 4 is a flowchart of the method according to the present invention; and.

DETAILED DESCRIPTION

The method according to the invention starts from a method of transporting a plurality of objects with a plurality of transport vehicles, wherein a starting point and a destination as well as at least one of a starting time and an arrival time are registered for each object. Further, a transport capacity and an actual location are registered for each transport vehicle, and a transport path network of possible transport paths of the transport vehicles and average speeds of the transport vehicles on the transport paths are defined. For this purpose, all actually possible transport paths available to the transport vehicles and the associated average speeds of the transport vehicles on these transport paths are determined. According to the present invention, the starting point and the destination as well as the respective associated at least one of the starting time and the arrival time are noted for each object in a space-time, i.e. in a special data format in a special data space. Then, on the basis of the transport path network, all suitable transport paths of all the possible transport paths between the objects coordinates are determined of each object and noted in the space-time. Suitable transport paths are those on which temporal requirements included in the object coordinates can be fulfilled with the average speeds of the transport vehicles on the transport paths. Suitable transport paths for the different objects are bundled or combined in the space-time into driving routes of the individual transport vehicles, wherein the transport capacities and the actual positions of the transport vehicles are considered. The driving routes, together with the starting points, the starting times, the destinations and the arrival times of the associated objects are transmitted to the transport vehicles involved which then drive along these driving routes.

A core feature of the method according to the invention is implementing the optimization of the driving routes to be driven along by the individual transport vehicles in a space-time. In this space-time which, besides the spatial coordinates of the starting points and the destinations as well as the suitable transport paths running between the starting points and the destinations, also comprises the time as a further coordinate, the driving routes which are possible at all and particularly which are possible and suitable, are easily found as bundles of transport paths of different objects. Particularly, in the space-time, different bundles or combinations of driving routes may be compared at manageable effort to optimize the driving routes for all transport vehicles involved. Particularly, possible transport paths of different objects may be combined according to their distances in the space-time for a potential bundling or combination as suitable transport paths, or, vice versa, they may be directly excluded from such a bundling or combination due to their distances in the space-time. As the transport path network, as a rule, is a two-dimensional transport network along the earth surface or may at least be considered as a two-dimensional transport path network in a projection onto the earth surface, the space-time to be used in the method according to the invention is a three-dimensional space, only. Thus, the notation of the object coordinates and of the transport paths as well as the comparison of the transport paths remains manageable in the space-time. Further, the courses of the transport paths and their bundling or combination is particularly comprehensible in this three-dimensional space-time so that the method according to the invention may not only be implemented fully automatically but also, at least partially, manually, for example to the extent of the step of bundling or combining the suitable transport paths of different objects to be transported.

The notation of the coordinates like the object coordinates and the notation and combination of the transport paths in the space-time includes storing these data in a special data format as well as handling and processing them in a special data space, i.e. the space-time.

In a same way as the starting points and the destinations as well as the associated starting times and arrival times of the objects are noted as object coordinates in the space-time, the actual locations of the transport vehicles together with the actual time may be noted as vehicle coordinates in the space-time. Then, the actual locations of the transport vehicles may be considered in that, on basis of the transport path network, suitable transport paths of all possible transports paths between the vehicle coordinates and neighboring starting points and associated starting times are determined in the space-time, noted in the space-time and considered in the step of bundling or combining in the space-time. Thus, the actual locations of the transport vehicles and the present time may be considered in the space-time in a same way as the object coordinates of the objects to be transported.

The notation in the space-time allows for considering periods of time which are needed for taking up an object into the transport vehicle or for delivering an object out of a transport vehicle in a simple way in that these periods of time are noted in the space-time and considered in determining and noting the suitable transport ways for the objects in the space-time. It is to be understood that said periods of time will depend on the nature of the objects to be transported. Thus, passengers, i.e. people, may board a transport vehicle and disembark a transport vehicle by their own as well as walk to its stop at the road side and reach their actual destination from such a stop at the road side by foot. For goods to be transported, like for example packets, this does not apply. Typically, they have to be taken up and delivered by the driver of the respective transport vehicle.

Preferably, the starting times and the arrival times of the objects are noted in the space-time as time frames, i.e. not as points in time. Each of the time frames may be defined by a point in time and a tolerance range, wherein the tolerance range may extend on both sides of the point in time or only on one side of the point in time. The latter means a starting time or an arrival time from the point in time up to the point in time plus the tolerance range. The time frames may be noted at an individual width. Thus, a very narrow time frame may be noted for a special object, because it has to be taken up into a transport vehicle or delivered out of the transport vehicle at a particular point in time, whereas very broad time frames may be assigned to other objects whose actual taking up or delivery points in time are less critical.

If, for an object to be transported, besides its starting point and its destination, only its starting time or its arrival time is noted, the other arrival or starting time results from the possible transport paths between the starting point and the destination and the associated average speeds of the transport vehicles on the transport paths. If both the starting time and the arrival time are noted, this reduces the possible transport paths to those which can be covered with the averaged speeds within the time difference between the arrival time and the starting time.

The method according to the invention may integrate normally scheduled public transport means in the transport. This particularly applies for passengers as objects to be transported. For this integration, the starting points and the destinations as well as the starting times and arrival times of normally scheduled public transport means available, which are within the periods of time between the starting times and the arrival times of the goods to be transported, are additionally noted in the space-time and included into the determination of suitable transport ways in such a way that the normally scheduled public transport means cover parts of the respective transport paths.

The transport capacity of the transport vehicles is preferably noted in form of a certain number of objects which may be transported at maximum. This number of objects noted may be the same for all transport vehicles. In this case, the optimization of the driving routes is simplified. Generally, the transport capacities may also be noted in other units than the number of objects and individually for each transport vehicle.

To reduce the complexity of the task of optimization with regard to the transport path network and the suitable transport paths resulting therefrom, main paths connecting nodal points may be defined in the transport path network. Then, in determining suitable transport paths of all possible transport paths for each object, the possible transport paths may be limited to those which run from the starting point of the object to one of the nearest neighboring nodal points, from one of the nearest neighboring nodal points to the destination of the object and between these nearest neighboring nodal points on the main paths only. This prioritization of the main paths very considerably reduces the number of the possible transport paths to be compared to each other. It is, however, to be understood that even in this embodiment of the invention, for closely neighboring starting points and destinations, suitable transport paths may be determined which do not run along main paths and not even pass the nodal points.

In the method according to the invention, the hierarchy of the transport paths discussed above may be extended to a further level. For this purpose, main connections connecting nodal centers may be defined in the transport path network, and in determining suitable transport paths of all possible transport paths for each object based on the transport path network the possible main paths may be limited to those main paths which run from one of the nodal points nearest neighboring the starting point to one of the nodal centers nearest neighboring this nodal point, to one of the nodal points nearest neighboring the destination from a nodal center nearest neighboring this one nodal point, and between these nodal centers only on the main connections. As these main connections, for example, the driving routes of normally scheduled public transport means may be considered. However, it also be to understood that even in this embodiment of the invention, for starting points and destinations which are closer to each other, suitable transport paths are determined which do not run along the main connections or even not pass the nodal centers.

The number of the suitable transport paths to be compared to each other, which is reduced by the prioritization of certain transport paths, is decisive when different combinations of possible driving routes of individual transport vehicles are assembled of suitable transport paths of different objects and compared to each other in bundling or combining. Due to limiting the suitable transport paths, the number of comparisons occurring is essentially reduced and thus often becomes manageable at all.

The criteria according to which an optimization is made in combining suitable transport paths for different objects into driving routes may particularly include the following criteria:

keeping at least one of the starting times and the arrival times of at least certain objects,
minimized deviations from at least one of the starting times and the arrival times of all objects,
maximized average utilization of the transport capacity of the transport vehicles used,
minimized driving distances of the transport vehicles used,
minimized periods of operation of the transport vehicles used,
minimized cost of operation of the transport vehicles used.

These criteria may be applied individually or in combination. If several of the criteria are applied in combination, they may be weighted with weighting factors with regard to each other. Such a weighting may also be carried out for individual objects or transport vehicles only. Thus, for example, certain transport vehicles may primarily be utilized, or certain objects may be transported with preferentially keeping their starting times and arrival times because a higher transport fare is paid for these object than for other objects. In case of a minimization of the cost of operation of the transport vehicles used, the personnel costs of drivers of the transport vehicles have also to be considered regularly.

Another option of making an optimization with regard to several criteria at one time is searching for a so-called Pareto-optimum. This is a point at which all criteria are simultaneously optimally fulfilled in that sense that there is no option left of further optimizing one of the criteria without deteriorating another one of the criteria.

The method according to the invention may also account for newly added objects to be transported. In practice, the method according to the invention will rarely be executed in such a way that no new objects to be transported are added during driving along the driving routes. Particularly, in case of added objects to be transported, their starting points, designations, at least one of their starting times and arrival times, as well as suitable transports paths are added, and the step of bundling or combining into the transport routes is once again executed considering the present actual locations of the transport vehicles, their present load of objects and their designations and optionally also their arrival times. The new driving routes resulting therefrom are transmitted to the transport vehicles involved. In this way, changes of the driving routes of the transport vehicles may occur to take up and deliver one or more added object to be transported.

Like the original step of bundling or combining the suitable transport paths, the repeated step of bundling or combining the suitable transport paths of the possible transports paths of the various objects may allow for that one or more objects change from one transport vehicle to another transport vehicle. Such changes of transport vehicles may, however, also be purposefully avoided or at least kept low in number to avoid the additional requirements which are associated with bringing together two transports vehicles in the space-time, and to also avoid the effort and the discomfort which are associated with each change of an object between the transport vehicles. This particularly applies, if the objects to be transported are passengers to which an as taxi-like as possible alternative to the public transport shall be offered. This is not compatible with frequent changes between the transport vehicles.

Independently of whether passengers or goods are transported as the objects in the method according to the invention, the transports of the objects executed with the transport vehicles are preferably registered and connected or associated with a cost value predetermined using a tariff. This cost value may then determine the fare which a passenger has to pay. Optionally, the cost value may be transmitted to at least one transport cost invoicing unit which then, for example, cashlessly collects the fare for passengers or the freight costs for goods.

A data server for carrying out the method according to the invention comprises at least one interface for receiving starting points, destinations, as well as at least one of starting times and arrival times of a plurality of objects, and actual locations of a plurality of transport vehicles. Further, the data server includes a databank for storing a transport path network of possible transport paths of the transport vehicles with average speeds of the transport vehicles on the transport paths. Additionally, the at least one or a further interface is provided for outputting driving routes to transport vehicles involved. The server is programmed for executing the method according to the invention. The data server according to the invention implements the method according to the invention at a central location to coordinate the transport vehicles available with regard to the transport of the objects to be transported. Each interface of the data server according to the invention may be realized by any known telecommunication interface which allows for receiving and outputting the described data. This interface does not need to be specially assigned to the data server according to the invention, it only has to be connected to a part of the data server on which the program implementing the method according to the invention runs. The further interface for outputting driving routes may in practice be the same at least one interface used for receiving starting points and destinations as well as at least one of starting times and arrival times of the objects and for receiving actual locations of the transport vehicles, and this one interface may be implemented by an internet access.

In the data server according to the invention, each interface for receiving or outputting may particularly be configured for data communication with mobile terminal equipment or devices. These mobile terminal devices may include tablets, mobile phones, smartphones and PDAs (Personal Digital Assistants). Thus, a passenger, as an object to be transported, may transmit his object data via his mobile phone to the data server. Via the same mobile phone, the passenger may receive a confirmation of his object data. On the other hand, the mobile phone of a driver of a transport vehicle may continuously transmit the actual location of the transport vehicle to the data server, and receive the driving route for the respective transport vehicle in opposite direction. This driving route may be directly output as a navigation display to guide the driver of the transport vehicle along the driving route with the starting points and destinations arranged thereon.

Particularly, each interface of the data server according to the invention may be configured for data communication with the respective mobile terminal device via an application program which is programmed on the respective mobile terminal device. Such an application program simplifies the data communication with the respective user, i.e. a passenger or a driver of one of the transport vehicles. Such application programs are also designated as Apps.

The data server according to the invention may further have an interface for transmitting a cost value of a transport carried out to at least one transport cost invoicing unit. This interface may be an also otherwise used interface or an additional interface of the data server. The transport cost invoicing unit may be a mobile telecom provider of the user of the respective mobile terminal device. Thus, particularly, the fare which a passenger has to pay may be invoiced with his mobile phone invoice.

For the practical implementation of the present invention, it may be suitable that each transport vehicle when approaching a starting point of one of the objects to be transported by it discloses its identity to this object, particularly a passenger, in a way visible from the outside. This at least applies if, in a same area at a same time, several such transport vehicles are on their way so that it is difficult for the passengers and also for the drivers of the transport vehicles to make the right allocations. An option to solve this problem is to indicate the name of the passenger to be taken up next on a big display. For personal protection it may be possible that each passenger—optionally every day—choses a nickname. For implementing this concept, an interface for transmitting object data related to the objects to a display device may be provided, the display device being arranged in or at the transport vehicle carrying out the transport of the respective objects.

In the method of using the data server for transporting a plurality of objects with a plurality of transport vehicles according to the invention, the starting point and the destination as well as at least one of the starting time and the arrival time of each of the objects to be transported, and the transport capacity and the actual location of each of the transport vehicles are received at the interface of the data server. The transport capacities and the transport path network of possible transport paths of the transport vehicles together with the average speeds of the transport vehicles on the transport paths are stored in the databank of the data server. The starting point and the destination as well as the respective associated at least one of the starting time and the arrival time of each of the objects to be transported are noted as object coordinates in the space-time, i.e. stored in the data format defined in this way by the data server. Further, on basis of the transport path network stored in its databank, the suitable transport paths of all the possible transport paths between the object coordinates of each of the objects to be transported are determined and noted in the space-time by the data server. Then, in the space-time, suitable transport paths for different objects are bundled or combined into driving routes of individual transport vehicles by the data server. Herein, the transport capacities and the actual locations of the transport vehicles are considered by the data server. Via the interface of the data server via which it has received the input data or via a further interface of the data server the driving routes including the starting points, the starting times, the destinations and the arrival times of the associated objects are transmitted to the transport vehicles involved in the respective driving routes.

Figure 1:
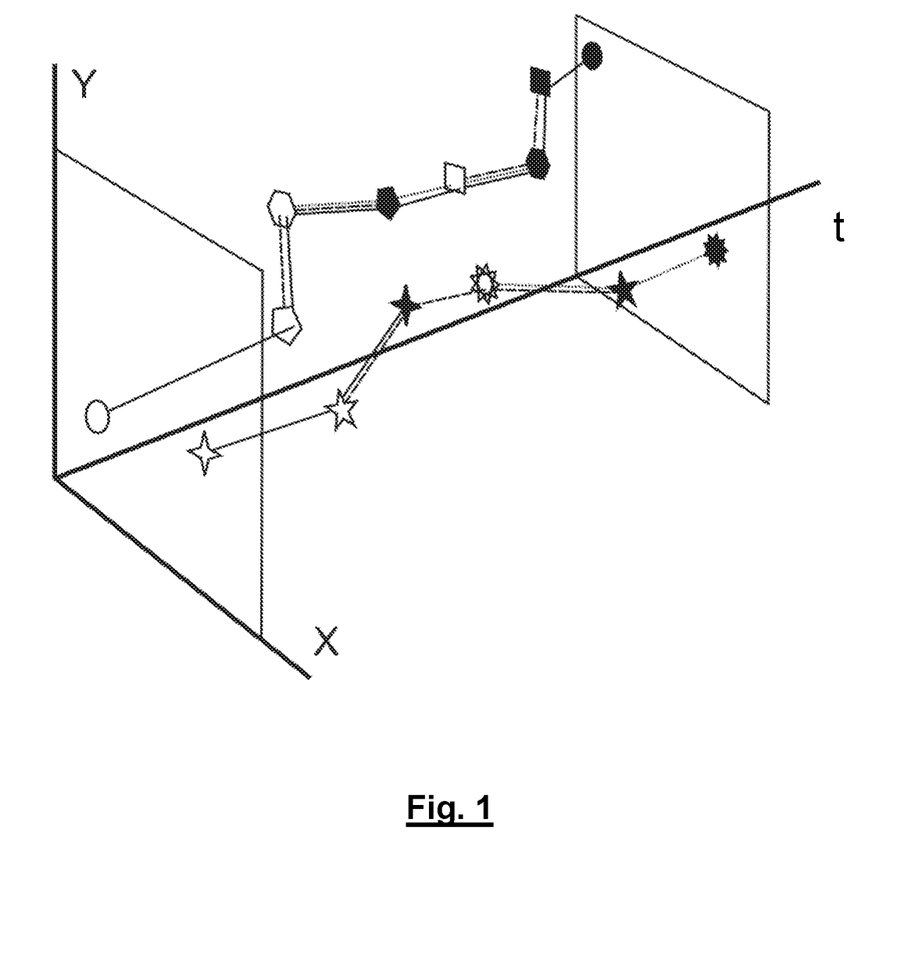
FIG. 1 shows object coordinates with associated transport paths combined into diving routes.

Now referring in greater detail to the drawings, FIG. 1 illustrates the notation of object coordinates for objects to be transported in a space-time. The spatial coordinates of the respective starting point are indicated in x- and y-direction by an open symbol, whereas the same closed or filled symbol marks the destination. The associated starting times and arrival times are noted in the third spatial direction along the time axis, i. e. in t-direction. Possible transport paths between the starting points and destinations are predetermined on basis of a transport path network not depicted here. This transport path network describes not only the course of its transport paths in x- and y-direction but also an average speed of the transport vehicles on the transport paths, and thus delimits the possible transport paths to those which are also temporally possible in the space-time. Suitable transport paths of all possible transport paths, which fit to the different objects in the space-time, are then bundled or combined into driving routes of individual transport vehicles. Here, the transport capacities and the actual locations of the transport vehicles are considered. In FIG. 1, two such bundles of transport paths for two different transport vehicles are depicted. The bundles of transport paths are also designated as driving routes here. The one driving route planed for the one transport vehicle starts at the open circle and ends at the full circle, whereas the other driving route planed for the other transport vehicle starts at the open four-point star and ends at the filled sun. Along these driving routes, different object coordinates are found always in the right sequence of starting point with associated starting time prior to destination with associated arrival time.

Figure 2:
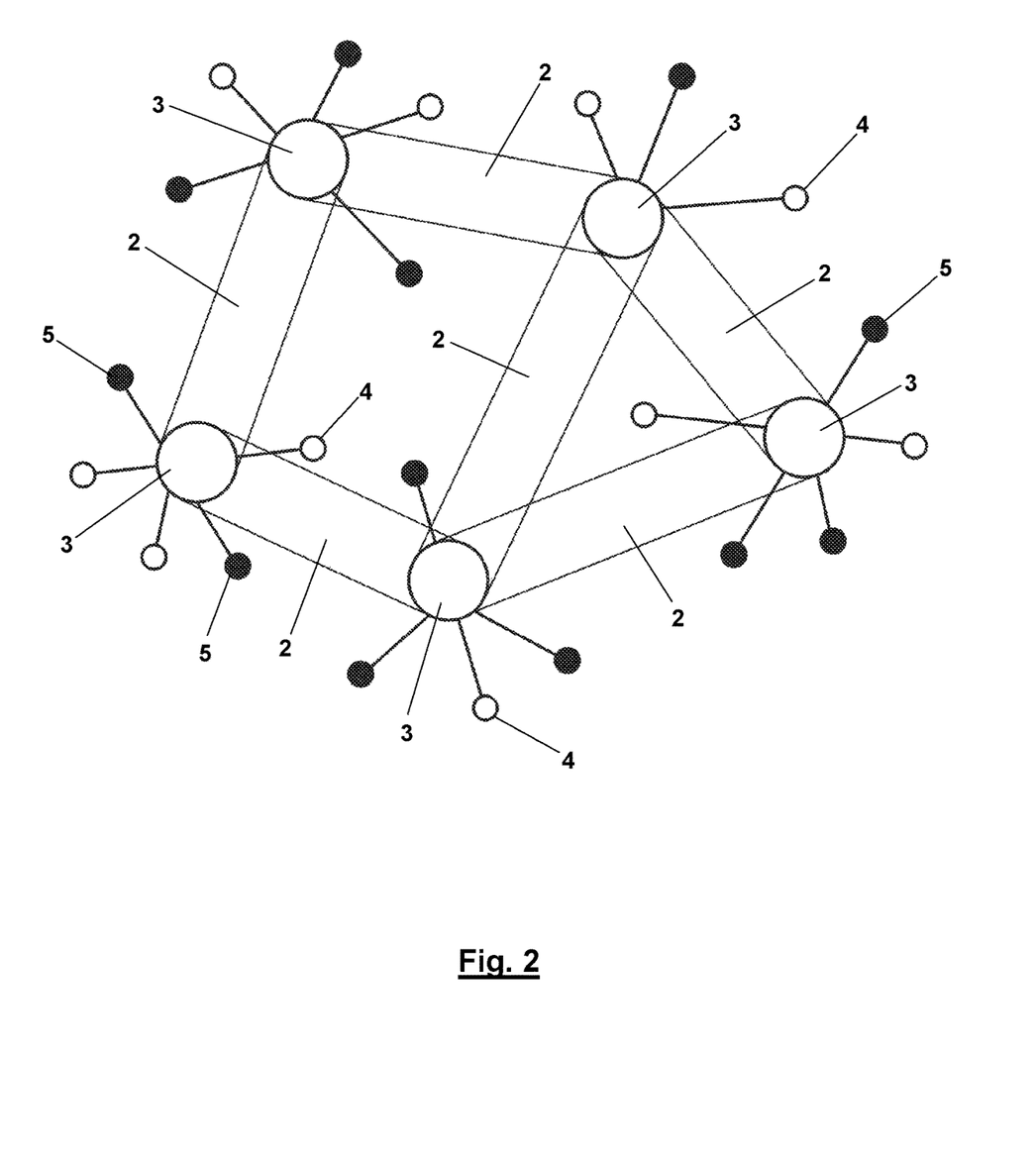
FIG. 2 schematically illustrates the definition of transport paths of a transport path network with main paths connecting nodal points.

In bundling the suitable transport paths of different objects into driving routes for the individual transport vehicles, an optimization is made. In this optimization, particularly ratings of different bundles of different suitable transport paths are compared to each other. To limit the number of the suitable transport paths in this comparison, a transport path network is used for determining the suitable transport paths in which, as illustrated in FIG. 2, main paths 2 are defined which connect nodal points 3. In determining the suitable transport paths of all possible transport paths for each object on basis of the transport path network illustrated in FIG. 2, the possible transport paths are limited to those which, from the starting point of the respective object, lead to one of the nearest neighboring nodal points 3 and from there via main paths 2 to one of the nodal points 3 nearest neighboring the destination 5 of the respective object. In one embodiment, only the nodal point 3 actually being the nearest neighboring nodal point 3 to the respective starting point 4 or destination 5 will be considered. In another embodiment, a particular starting point 4 or destination 5 is alternatively assigned to several nodal points. This assignment to several nodal points, however, causes an exponential increase of the number of the suitable transport paths.

Figure 3:
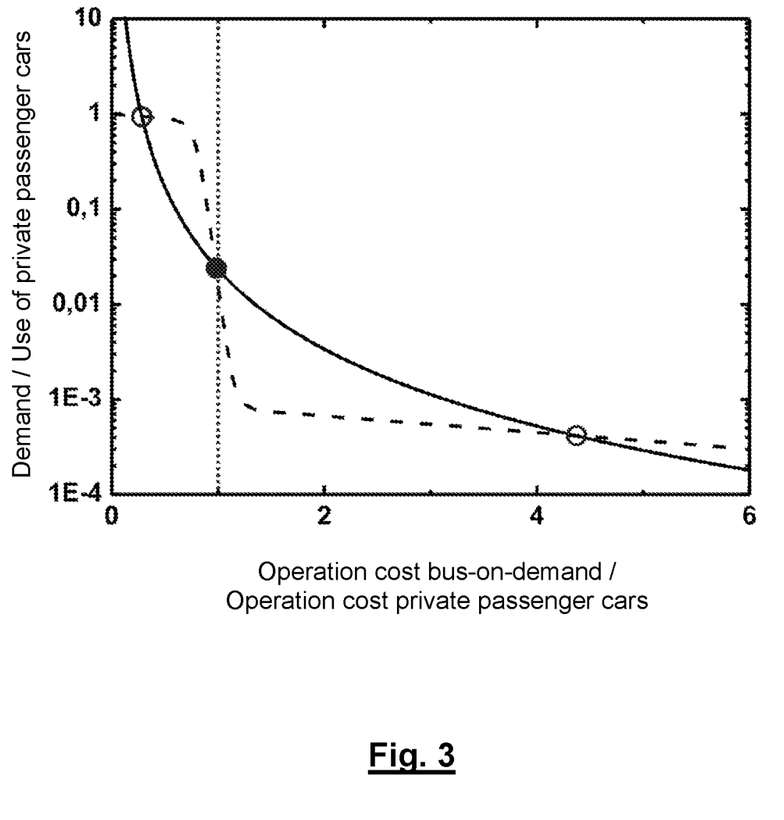
FIG. 3 illustrates price-demand dynamics of a bus-on-demand.

In FIG. 3, a relative demand which would be necessary to break even in operating a bus-on-demand is plotted as a continuous line over the fare indicated in units of the cost of a private passenger car. The dashed line indicates the estimated fare-demand-correlation. If the fare approaches the cost of an own passenger car, which is indicated with a dotted line, from the right hand side, the demand strongly increases. In every area in which the dashed curve or line is above the continuous curve or line, a break even in operating the bus-on-demand may be expected. The logarithmic depiction of the demand indicates that the estimated fare-demand-correlation needs not to be very precise to demonstrate that there are three intersections of the two curves. The intersection in the middle, however, represents an unstable point of operation. If, in this intersection, the fare increases towards the right hand side of FIG. 3, the demand quickly drops, and the system runs up to the right hand side intersection within short time. This right intersection is a stable point of operation. It, however, only indicates a niche market at a fare which is about four times to five times the operation cost of a private passenger car. It would, however, be of interest to get from the middle intersection by a cost reduction to the intersection on the left hand side at which a major part of the mobility demand is covered by demand controlled public transport and at which a breakeven is achieved despite low fares. By means of the optimization of the driving routes of the individual transport vehicles achieved by the method according to the invention, it becomes possible to get to the left hand side intersection.

Figure 4:
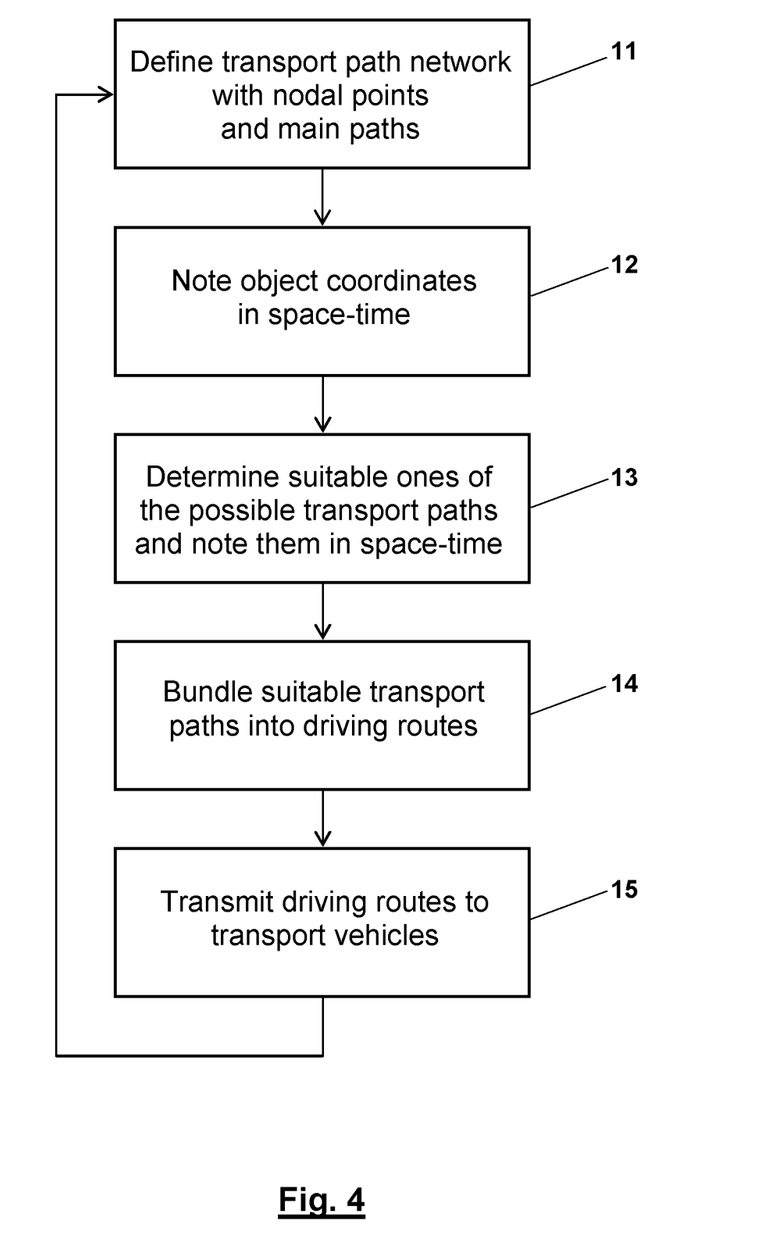

The flowchart of the method according to the invention according to FIG. 4 starts with a step 11 in which a transport path network is defined for the transport vehicles available. The transport path network is defined with nodal points which are connected by main paths, see FIG. 2. In a step 12, object coordinates, i.e. starting points and associated starting times as well as destinations and associated arrival times of objects to be transported are noted in a space-time. Then, in a step 13, suitable transport paths of the transport paths between the object coordinates of each object which are possible according to the transport path network are determined and noted in the space-time. In a step 14, suitable transport paths are bundles or combined into driving routes for the individual transport vehicles. Here, the transport capacities and the actual locations of the transport vehicles available are considered. Further, in step 14, a comparison of different bundlings of the transport paths are made according to predetermined criteria to select one bundling by which a maximum possible fulfillment of all criteria is achieved. In a step 15, the driving routes together with the starting points and the starting time as well as the destinations and the arrival times of the objects to be transported are transmitted to the transport vehicles involved in the transport of the respective objects to be transported. In the running operation of the method, a closed loop runs over the steps 12 to 15 so that added objects may also be considered. In each repetition of the step 12, the actual location of the respective transport vehicle and the actual time may be used as the updated starting point and the associated starting time of the objects already taken up into the respective transport vehicle.

Figure 5:
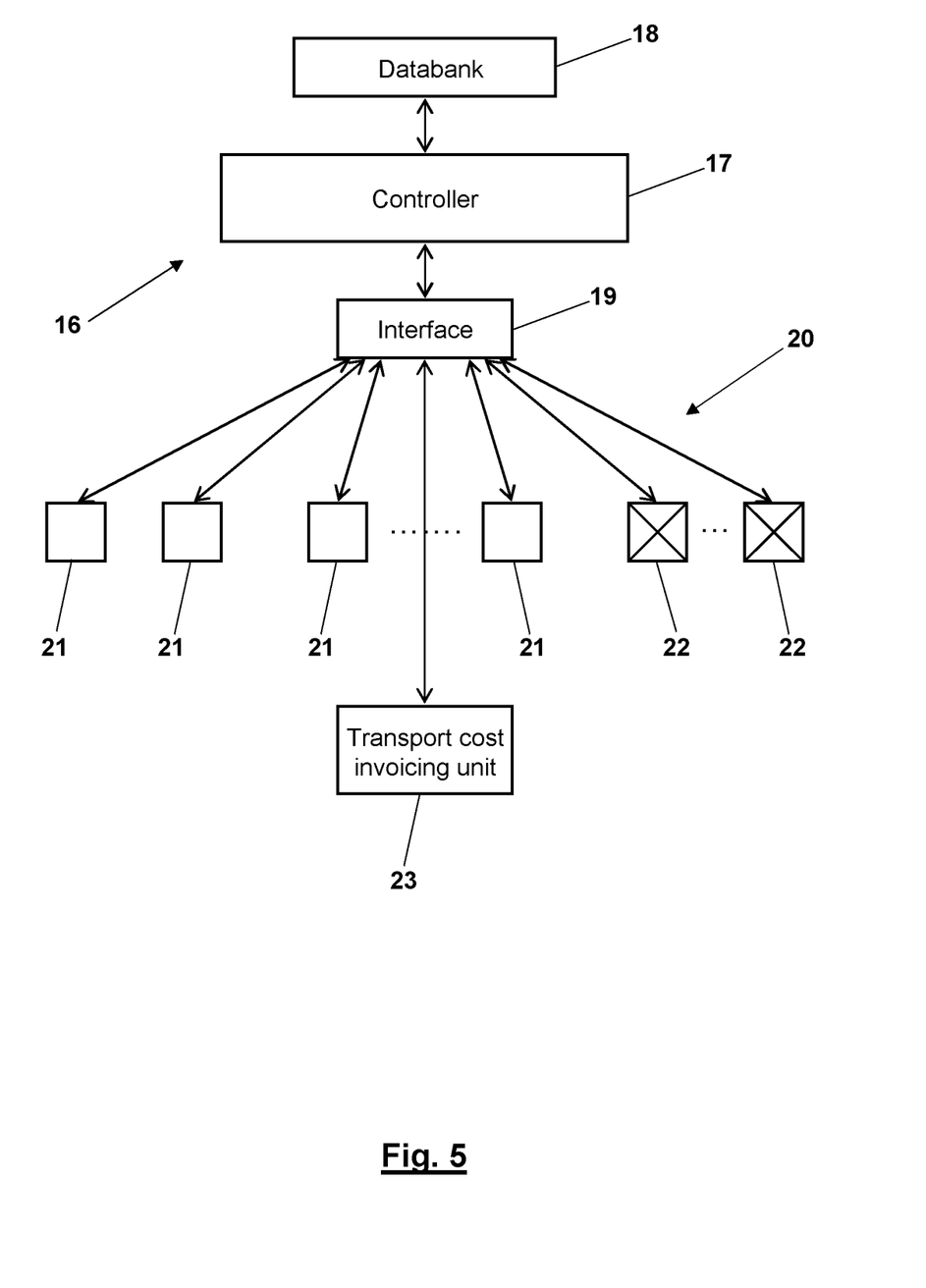
FIG. 5 is a block diagram of the data server according to the present invention.

The data server 16 depicted in FIG. 5 in form of a block diagram includes a controller 17 which is programmed for carrying out the method according to the invention, a databank 18 for storing a transport capacity of the transport vehicles and a transport path network of possible transport paths of the transport vehicles together with average speeds of the transport vehicles on the transport paths, and an interface 19. Via the interface 19 the data server 16 communicates, for example via the internet 20 or via mobile telecommunication networks, with terminal devices 21 and 22. The terminal devices 21 may be mobile devices belonging to passengers which want to be transported as objects in a bus-on-demand, whereas the terminal devices 22 may be terminal devices in a bus-on-demand serving as the transport vehicle. On the terminal devices 21 and 22, special application programs are programmed which simplify the communication of the users of the terminal equipment 21 and 22 with the data server 16. Thus, a potential passenger may at first enquire with the data server 16 which transport options at which conditions would be available for him before he actually requests the transport. At the terminal equipment 22, besides the driving routes to be driven along by the individual transport vehicles, fares to be requested from the respective passengers may be indicated to directly cash them in by the driver of the respective transport vehicle. The data server may, however, also communicate via the interface 19 with a transport invoicing unit 23 to transmit a cost value of a transport carried out to the transport invoicing unit 23 so that the transport invoicing unit 23 may cashlessly invoice the fare.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method of transporting a plurality of objects with a plurality of transport vehicles, the method comprising in one or more controllers, noting, for each object of the plurality of objects, a starting point and a destination as well as a starting time and an arrival time as object coordinates in a space-time, in said one or more controllers, noting, for each transport vehicle of the plurality of transport vehicles, a transport capacity and an actual location, in said one or more controllers, defining a transport path network of possible transport paths of the transport vehicles of the plurality of transport vehicles together with average speeds of the transport vehicle of the plurality of transport vehicles on the possible transport paths, in said one or more controllers, determining, for each object of the plurality of objects, suitable transport paths of the possible transport paths extending between the object coordinates of the respective object based on the transport path network, and noting the suitable transport paths in the space-time, in said one or more controllers, bundling, in the space-time, one of the suitable transport paths per object of the plurality of objects into driving routes of individual transport vehicles of the plurality of transport vehicles, wherein the transport capacities and the actual locations of the transport vehicles of the plurality of transport vehicles are considered, with said one or more controllers, causing the driving routes together with the starting points, the starting times, the destinations and the arrival times of the associated objects of the plurality of objects to be transmitted to those transport vehicles of the plurality of transport vehicles which are involved in the respective driving route, and transporting the plurality of objects with the plurality of transport vehicles in that the involved transport vehicles of the plurality of transport vehicles are driven along the transmitted driving routes.

2. The method of claim 1, wherein the actual locations of the transport vehicles of the plurality of transport vehicles are considered in that they are noted as vehicle coordinates in the space-time and in that, based on the transport path network, suitable transport paths of the possible transports paths between the vehicle coordinates and the object coordinates of starting points and associated starting times of neighboring objects of the plurality of objects are determined, are noted in the space-time and are considered in the step of bundling.

3. The method of claim 1, wherein periods of time which are needed for taking up an object into one transport vehicle of the plurality of transport vehicles and for delivering an object out of the one transport vehicle of the plurality of transport are noted and considered in noting the suitable transport paths in the space-time.

4. The method of claim 1, wherein at least one of the starting times and the arrival times of the objects are noted as time frames.

5. The method of claim 1, wherein additional starting points and destinations as well as starting times and arrival times of existing normally scheduled public transport means which are within a period of time between the starting time and the arrival time of at least one of the objects of the plurality of objects are additionally noted in the space-time and that in determining the suitable transport paths for the at least one object such transport paths are considered on which the at least one object is transported over at least a part of the possible transport paths by the normally scheduled transport means.

6. The method of claim 1, wherein the transport capacity for each transport vehicle is noted in form of a certain number of objects.

7. The method of claim 1, wherein, in the transport path network, nodal points and main paths connecting the nodal points are defined, and wherein, in determining the suitable transport paths of the possible transport paths for each object of the plurality of objects based on the transport path network, the possible transport paths are limited to those which run
from the starting point of the respective object to one of the nodal points nearest neighboring the starting point,
to the destination of the object from one of the nodal points nearest neighboring the destination, and
between the nodal points on the main paths only.

8. The method of claim 7, wherein, in the transport path network, nodal centers and main connections connecting the nodal centers are defined, and wherein, in determining the suitable transport paths of the possible transport paths for each object of the plurality of objects based on the transport path network, the possible main paths are limited to those which run
from one first nodal point of those of the nodal points which are nearest neighboring the starting point to one first nodal center of those of the nodal centers which are nearest neighboring the respective one first nodal point,
to one second nodal point of those of the nodal points which are nearest neighboring the destination from one second nodal center of those of the nodal centers which are nearest neighboring the respective one second nodal point and
from the respective one first nodal center to the respective one second modal center on one of the main connections only.

9. The method of claim 1, wherein in the step of bundling, different combinations of possible driving routes of individual transport vehicles of the plurality of transport vehicles are combined of the suitable transport paths and compared to each other.

10. The method of claim 1, wherein, in the step of bundling, an optimization is made by said one or more controllers with regard to at least one of the following criteria:
keeping at least one of the starting times and the arrival times of at least certain objects of the plurality of objects,
minimizing deviations from at least one of the starting times and the arrival times of all the objects of the plurality of objects,
maximizing an average utilization of the transport capacities of the transport vehicles of the plurality of transport vehicles which are actually used,
minimizing driving distance of the transport vehicles of the plurality of transport vehicles which are actually used,
minimizing operation times of the transport vehicles of the plurality of transport vehicles which are actually used,
minimizing operation cost of the transport vehicles of the plurality of transport vehicles which are actually used.

11. The method of claim 1, wherein, with an added object to be transported, its starting point and its destination as well as at least one its starting time and its arrival time are added as object coordinates in the space-time by said one or more controllers, wherein suitable transport paths of the possible transport paths between the object coordinates of the added object are determined by said one or more controllers based on the transport path network, and added in the space-time, wherein the step of bundling into driving routes is repeated considering the actual locations of the transport vehicles, their actual load of objects and the destinations and arrival time of these objects, and wherein resulting new driving routes are transmitted to the involved transport vehicles.

12. The method of claim 1, wherein the objects are passengers.

13. The method of claim 1, wherein executed transports of the objects of the plurality of objects with the transport vehicles of the plurality of transport vehicles are registered and wherein a cost value is assigned to each executed transport according to a predetermined tariff.

14. The method of claim 13, wherein the cost value is transmitted to a transport cost invoicing unit.

15. The method of claim 1,
wherein a data server includes at least one controller of said one or more controllers for controlling the data server, the data server further comprising,
at least one interface configured for receiving the starting point and the destination as well as at least one of the starting time and the arrival time of each object of the plurality of objects and for receiving the actual location of each transport vehicle of the plurality of transport vehicles,
a databank configured for storing the transport capacity of each transport vehicle of the plurality of transport vehicles and the transport path network of possible paths of each transport vehicle of the plurality of transport vehicles together with the average speeds of the transport vehicles of the plurality of transport vehicles on the transport paths, and
wherein the at least one interface or a further interface is configured for transmitting driving route to those transport vehicles of the plurality of transport vehicles which are involved in the respective driving route,
wherein, at the interface of the data server, the starting point and the destination as well as at least one of the starting time and the arrival times of each object of the plurality of objects are received,
wherein, at the interface of the data server, the actual location of each transport vehicle of a plurality of transport vehicles is received,
wherein the transport capacity of each transport vehicle of the plurality of transport vehicles and the transport path network of the possible transport paths of each transport vehicle of the plurality of transport vehicles together with average speeds of the transport vehicles of the plurality of transport vehicles on the transport paths are stored in the databank of the data server, wherein, for each object of the plurality of objects, the starting point and the destination as well as the at least one of the starting time and the arrival time are noted by the controller of the data server as the object coordinates in the space-time, wherein, for each object of the plurality of objects, the suitable transport paths of the possible transport paths between the object coordinates of the respective object are determined by said at least one controller of the data server based on the transport path network, and the suitable transport paths are noted by the controller of the data server in the space-time, wherein the one of the suitable transport paths per object of the plurality of objects is bundled by the controller of the data server in the space-time into driving routes of the individual transport vehicles of the plurality of transport vehicles, wherein the transport capacities and the actual locations of the transport vehicles of the plurality of transport vehicles are considered by the controller of the data server, and wherein the driving routes together with the starting points, the starting times, the destinations and the arrival times of the associated objects of the plurality of objects are transmitted by the controller of the data server via the interface or the further interface of the data server to those transport vehicles of the plurality of transport vehicles which are involved.

16. A data server for use in performing a method of transporting a plurality of objects with a plurality of transport vehicles, the data server comprising:
at least one interface configured for receiving a starting point and a destination as well as at least one of a starting time and an arrival time of each object of a plurality of objects and for receiving actual location of each transport vehicle of a plurality of transport vehicles,
a databank, and
one or more controllers configured to perform a process of,
noting, for each object of the plurality of objects, the starting point and the destination as well as at least one of the starting time and the arrival time as object coordinates in a space-time,
noting, for each transport vehicle of the plurality of transport vehicles, a transport capacity and an actual location,
defining a transport path network of possible transport paths of the transport vehicles of the plurality of transport vehicles together with average speeds of the transport vehicle of the plurality of transport vehicles on the possible transport paths,
determining, for each object of the plurality of objects, suitable transport paths of the possible transport paths extending between the object coordinates of the respective object based on the transport path network, and noting the suitable transport paths in the space-time,
bundling, in the space-time, one of the suitable transport paths per object of the plurality of objects into driving routes of individual transport vehicles of the plurality of transport vehicles, wherein the transport capacities and the actual locations of the transport vehicles of the plurality of transport vehicles are considered,
storing, in the databank, the transport capacity of each transport vehicle of the plurality of transport vehicles and the transport path network of possible paths of each transport vehicle of the plurality of transport vehicles together with average speeds of the transport vehicles of the plurality of transport vehicles on the transport paths, and
causing the driving routes together with the starting points, the starting times, the destinations and the arrival times of the associated objects of the plurality of objects to be transmitted from the at least one interface or a further interface to those transport vehicles of the plurality of transport vehicles which are involved in the respective driving route to enable transporting the plurality of objects with the plurality of transport vehicles by driving the involved transport vehicles of the plurality of transport vehicles along the transmitted driving routes.

17. The data server of claim 16, wherein the at least one interface or the further interface is configured for data communication with mobile terminal devices, wherein the mobile terminal devices are selected from a group including tablets, mobile phones, smartphones and PDAs.

18. The data server of claim 17, wherein the at least one interface or the further interface is configured for data communication with the mobile terminal devices via an application program which is programmed on the respective one of the mobile terminal devices.

19. The data server of claim 17, wherein the at least one interface or the further interface or an even further interface is configured for transmitting a cost value of an executed transport to at least one transport cost invoicing unit.

20. The data server of claim 17, wherein the at least one interface or the further interface or an even further interface is configured for transmitting object data related to the objects of the plurality of objects to be transported to a display unit which is arranged in or at the transport vehicle involved in the transport of the respective object.

* * * * *